(12) United States Patent
Byun et al.

(10) Patent No.: US 11,154,849 B2
(45) Date of Patent: Oct. 26, 2021

(54) METHOD OF MANUFACTURING A HONEYCOMB METAL STRUCTURE USING ALUMINUM POWDER

(71) Applicant: KOREA INSTITUTE OF SCIENCE AND TECHNOLOGY, Seoul (KR)

(72) Inventors: Ji Young Byun, Seoul (KR); Sang Hoon Kim, Seoul (KR); Jong Sik Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 297 days.

(21) Appl. No.: 16/255,662

(22) Filed: Jan. 23, 2019

(65) Prior Publication Data

US 2019/0224662 A1   Jul. 25, 2019

(30) Foreign Application Priority Data

Jan. 25, 2018   (KR) .................. 10-2018-0009185

(51) Int. Cl.
*B01J 35/04*   (2006.01)
*B01J 23/86*   (2006.01)
(Continued)

(52) U.S. Cl.
CPC ............. *B01J 35/04* (2013.01); *B01J 21/02* (2013.01); *B01J 23/862* (2013.01); *B01J 35/002* (2013.01);
(Continued)

(58) Field of Classification Search
CPC ...... B01J 35/04; B01J 35/002; B01J 37/0225; B01J 37/0228; B01J 37/023; B01J 37/08;
(Continued)

(56) References Cited

U.S. PATENT DOCUMENTS 3,255,027 A * 6/1966 Talsma .................. C04B 35/65
501/85
5,603,983 A * 2/1997 Clough ............. C04B 35/62847
427/126.3
(Continued)

FOREIGN PATENT DOCUMENTS

CN    10 7029722    *  8/2017  ............. B01D 53/56
KR    2004 0039951  *  5/2004  ............. B01D 53/86
(Continued)

OTHER PUBLICATIONS

Korean Office Action dated Jul. 18, 2019.

*Primary Examiner* — Patricia L. Hailey
(74) *Attorney, Agent, or Firm* — Rabin & Berdo, P.C.

(57) ABSTRACT

A method of manufacturing a honeycomb metal structure includes providing a substrate comprising iron (Fe) and a container containing water; coating at least a part of the substrate with a viscid material whose viscosity is increased by moisture; attaching metal powder onto the viscid material; adhering the metal powder to the substrate due to an increase in viscosity of the viscid material by evaporating a portion of the water in the container and supplying moisture to the viscid material; and generating an uneven structure made of the metal powder bonded to the substrate by performing a heat treatment on the substrate to which the metal powder is adhered. The heat treatment may include performing a first heat treatment on the substrate to generate an intermetallic layer at an interface between the substrate and the metal powder; and performing a second heat treatment to dissolve the intermetallic compound layer.

20 Claims, 10 Drawing Sheets

(51) Int. Cl.
*B01J 37/08* (2006.01)
*B01J 37/02* (2006.01)
*B01J 21/02* (2006.01)
*B01J 35/00* (2006.01)
*F01N 3/00* (2006.01)

(52) U.S. Cl.
CPC ......... *B01J 37/023* (2013.01); *B01J 37/0225* (2013.01); *B01J 37/0228* (2013.01); *B01J 37/08* (2013.01); *F01N 3/00* (2013.01)

(58) Field of Classification Search
CPC ..... B01J 21/02; B01J 23/862; C23C 18/1291; C23C 18/1241; C23C 18/1245; B22F 5/10; B22F 2301/052; B22F 7/04; B22F 2007/042; B22F 7/08
USPC .............. 502/314, 258, 263, 527.19, 527.24, 502/527.11; 428/116; 148/240, 513, 148/514, 527, 529, 531, 535, 559; 977/890, 900; 55/524, 529; 419/10, 45, 419/46, 66; 75/414; 29/890; 420/548; 427/156, 214, 216, 229, 256, 261, 271, 427/372.2, 383.1
See application file for complete search history.

(56) References Cited

U.S. PATENT DOCUMENTS

| | | | | |
|---|---|---|---|---|
| 5,648,176 A | * | 7/1997 | Nakagawa | F01N 3/281 428/593 |
| 5,686,150 A | * | 11/1997 | Matsumoto | H01M 4/925 427/558 |
| 9,543,569 B2 | * | 1/2017 | Worsley | H01B 1/04 |
| 10,376,872 B2 | * | 8/2019 | Xiao | B01J 23/44 |
| 2006/0166029 A1 | * | 7/2006 | Inaguma | C22C 38/06 428/653 |
| 2006/0257620 A1 | * | 11/2006 | Noguchi | B01D 46/2418 428/116 |

FOREIGN PATENT DOCUMENTS

| | | |
|---|---|---|
| KR | 10-2012-0126340 A | 11/2012 |
| KR | 10-1305451 B1 | 9/2013 |

\* cited by examiner

METHOD OF MANUFACTURING A HONEYCOMB METAL STRUCTURE USING ALUMINUM POWDER

CROSS-REFERENCE TO RELATED PATENT APPLICATION

This application claims the benefit of Korean Patent Application No. 10-2018-0009185, filed on Jan. 25, 2018, in the Korean Intellectual Property Office, the disclosure of which is incorporated herein in its entirety by reference.

BACKGROUND

1. Field

The present invention relates to a method of manufacturing a honeycomb metal structure including aluminum (Al) powder, and a metal catalyst module including the honeycomb metal structure and, more particularly, to a method of manufacturing a metal structure having high heat resistance characteristics by generating an uneven structure on a metal substrate of a honeycomb structure, by using Al powder, and then performing heat treatment, and a metal catalyst module including the metal structure.

2. Description of the Related Art

A metal catalyst module may be manufactured by attaching a porous support layer and an active catalyst component onto the surface of a metal structure such as a metal plate or metal mesh. Compared to a conventional reactor using a ceramic structure, the metal catalyst module may have a high thermal conductivity to achieve fast temperature response characteristics, and may use thin metal to increase a surface area per unit volume. In addition, the metal catalyst module may reduce pressure drop, may be easily fabricated due to an excellent formability, and may increase durability due to a high mechanical strength.

When a metal structure is coated with a porous support layer and a catalyst and is used for a catalytic reactor operating at high temperature, since a large difference in thermal expansion coefficient is present between metal and a porous ceramic support, the porous support layer is easily peeled off. To solve the above problem, research is being conducted on a method of generating an uneven structure on the surface of a metal structure and coating a porous support layer on the uneven structure.

An iron (Fe)-aluminum (Al)-chromium (Cr) plate having an uneven structure is produced by scattering Fe—Cr—Al powder over the surface of a heat-resistant Fe—Cr—Al-based metal plate and sintering the metal plate, and a catalytic activated plate is manufactured by wash-coating porous γ-alumina (γ-Al$_2$O$_3$) on the Fe—Cr—Al plate. It is reported that, in the catalytic activated plate manufactured as described above, the porous γ-alumina may have durability and may not be peeled off when a thermal cycle test is repeated 1,000 times at room temperature to 700° C. (KR 10-1305451).

SUMMARY

In general, when powder having a particle size equal to or less than several hundred micrometers is supplied onto the surface of a plate and the plate is tilted while being transported or handled, the powder is easily detached from the surface of the plate. In this case, an uneven structure is not uniformly generated on the surface of the plate. Furthermore, when an uneven structure is to be generated on a wire having a diameter equal to or less than several hundred micrometers, since the wire has a circular cross-section, it is regarded that metal powder scattered to generate an uneven structure is not easily attachable to the surface of the wire. In particular, it is not easy to attach metal powder to and generate an uneven structure on a metal substrate having a large surface area and a complex structure, e.g., a honeycomb structure.

The present invention provides a method of manufacturing a honeycomb metal structure having high heat resistance characteristics by generating an uneven structure on a substrate of a honeycomb structure, by using aluminum (Al) powder, and then performing heat treatment.

The present invention also provides a catalyst module including the honeycomb metal structure. The uneven metal surface structure generated by the Al powder prevents a porous support layer from being exfoliated and provides high-temperature heat-resistance characteristics by preventing the honeycomb metal structure from degradation in oxidative environments.

However, the scope of the present invention is not limited thereto.

According to an aspect of the present invention, there is provided a method of manufacturing a honeycomb metal structure, the method including preparing a honeycomb structure including at least one substrate including iron (Fe), coating at least a part of the substrate with a viscid material whose viscosity is increased by moisture, attaching metal powder onto the viscid material, adhering the metal powder to the substrate by supplying the moisture to the viscid material, and generating an uneven structure made of the metal powder bonded to the substrate, by performing heat treatment on the substrate to which the metal powder is adhered.

The adhering of the metal powder may include preparing the substrate including the metal powder attached to the viscid material, and a container containing moisture, evaporating and supplying the moisture to the viscid material, and adhering the metal powder to the substrate due to an increase in viscidity of the viscid material.

The heat treatment may include generating an intermetallic compound layer at an interface between the substrate and the metal powder by performing first heat treatment on the substrate to which the metal powder is adhered, and dissolving the intermetallic compound layer into the metal substrate by performing the second heat treatment on the first-heat-treated substrate.

The heat treatment may further include generating voids at the interface between the metal powder and the metal substrate.

The heat treatment may include removing the viscid material.

The viscid material may include at least one selected from a group consisting of polyvinyl alcohol (PVA), polyethylene (PE), polypropylene (PP), polystyrene (PS), polyethylene glycol (PEG), polymethyl methacrylate (PMMA), polyoxymethylene (POM), polyacrylic acid (PAA), and styrene-butadiene rubber carboxymethyl cellulose, or a combination thereof.

The metal powder may include aluminum (Al) powder or Al-silicon (Si) alloy powder.

The first heat treatment may be performed for 1 minute to 4 hours at a heating temperature $T_H$ satisfying equation (1).

$$Tm \leq T_H \leq 1.3*Tm \qquad \text{Eq. (1)}$$

(where Tm denotes a melting point of the metal powder.)

The intermetallic compound layer may include aluminide or silicide.

The second heat treatment may be performed at 900° C. to 1,200° C. for 10 hours to 36 hours.

The first heat treatment and the second heat treatment may be performed consecutively.

The heat treatment may be performed in an inert gas or reducing gas atmosphere.

According to another aspect of the present invention, there is provided a honeycomb metal structure including a honeycomb structure including at least one substrate including iron (Fe), and an uneven structure generated on at least one surface of the substrate, wherein the uneven structure is made of metal, and wherein voids are generated at the interface between the metal powder and the metal substrate.

According to another aspect of the present invention, there is provided a honeycomb metal catalyst module including a honeycomb structure including at least one substrate including iron (Fe), an uneven structure generated on at least one surface of the substrate, and a catalyst layer coated on the uneven structure, wherein the uneven structure is made of metal, and wherein voids are generated at the interface between the metal powder and the metal substrate.

The catalyst layer may include a porous support layer, and a metal catalyst included in the porous support layer.

BRIEF DESCRIPTION OF THE DRAWINGS

The above and other features and advantages of the present invention will become more apparent by describing in detail embodiments thereof with reference to the attached drawings in which.

DETAILED DESCRIPTION

Figure 1A:
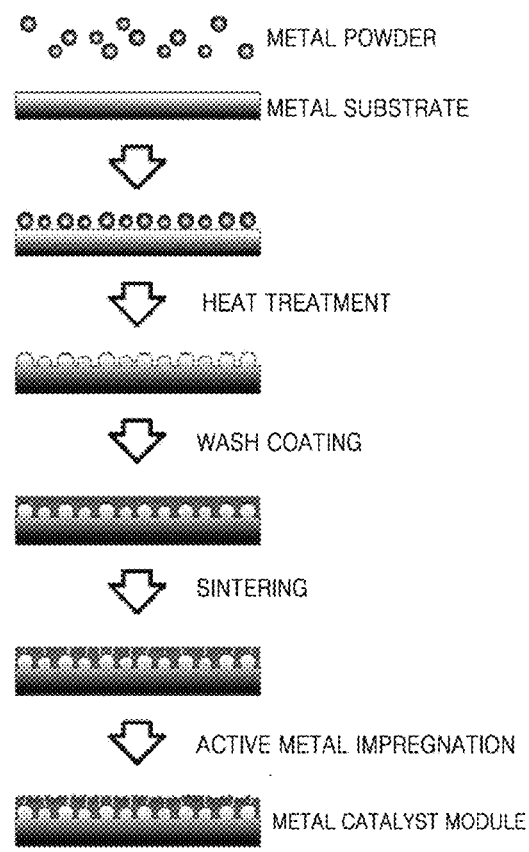
FIGS. 1A and 1B are cross-sectional views for describing a conventional method of manufacturing a metal catalyst module including an uneven structure.

The present invention will now be described more fully with reference to the accompanying drawings, in which embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to one of ordinary skill in the art. It should be understood, however, that there is no intent to limit embodiments of the invention to the particular forms disclosed, but conversely, embodiments of the invention are to cover all modifications, equivalents, and alternatives falling within the scope of the invention. In the drawings, like reference numerals denote like elements and the lengths, areas, thicknesses, or shapes of elements may be exaggerated for clarity of explanation.

The following description is given of embodiments of the present invention with reference to the attached drawings in such a manner that the present invention can be easily carried out by one of ordinary skill in the art.

Method of Manufacturing Honeycomb Metal Structure Including Uneven Structure

A method of manufacturing a metal structure including an uneven structure will now be described with reference to FIGS. 1 to 3.

Figure 1B:
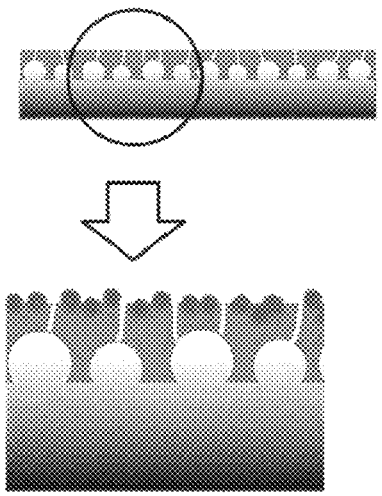

FIGS. 1A and 1B are cross-sectional views for describing a conventional method of manufacturing a metal catalyst module including an uneven structure.

Referring to FIGS. 1A and 1B, for the conventional metal catalyst module including an uneven structure, a metal structure including an uneven structure is manufactured by attaching metal powder onto an iron (Fe)-aluminum (Al)-chromium (Cr)-based metal substrate having high heat resistance, and then performing heat treatment. However, when the metal powder is attached onto the metal substrate, the metal powder may not be easily uniformly distributed on the metal substrate, and the metal substrate may not be easily handled before heat treatment because the metal powder is not firmly attached thereto.

Figure 2:
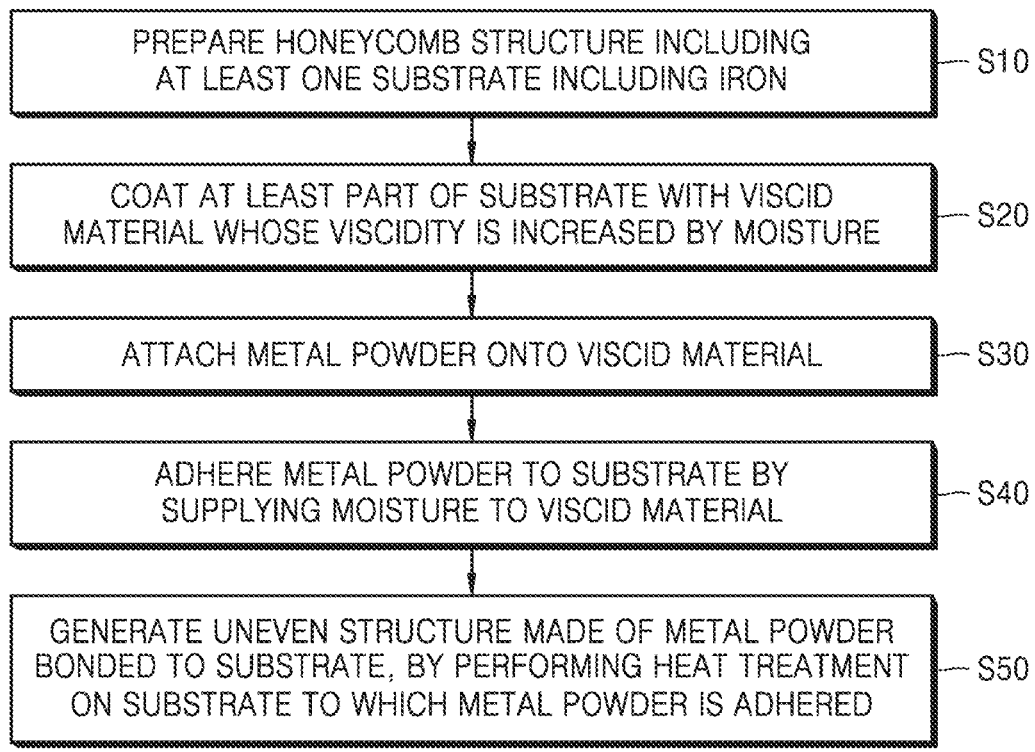
FIG. 2 is a flowchart of a method of manufacturing a honeycomb metal structure, according to an embodiment of the present invention.
Figure 3:
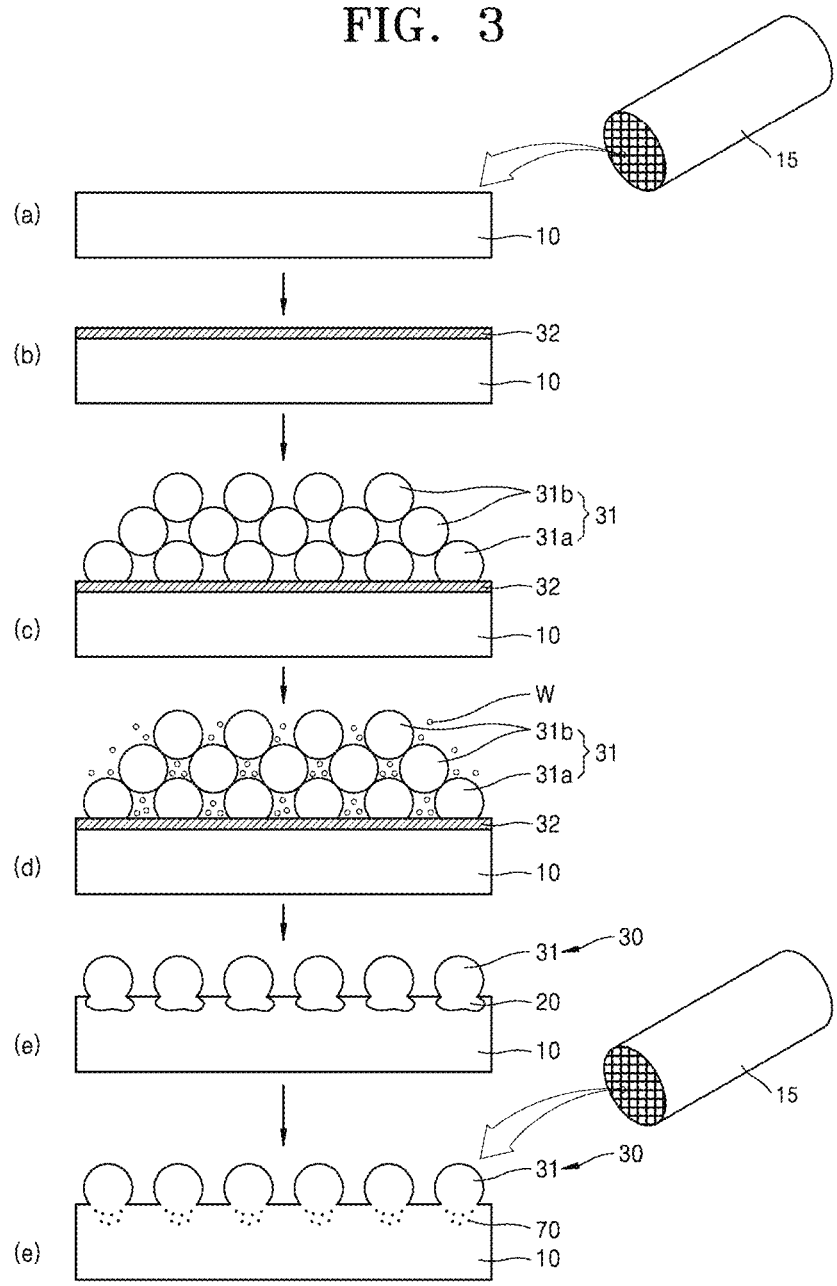
FIG. 3 illustrates cross-sectional views for describing the method of manufacturing the honeycomb metal structure, according to an embodiment of the present invention.

FIG. 2 is a flowchart of a method of manufacturing a honeycomb metal structure 1, according to an embodiment of the present invention, and FIG. 3 illustrates cross-sectional views for describing the method of manufacturing the honeycomb metal structure 1, according to an embodiment of the present invention.

According to an embodiment of the present invention, the method of manufacturing the honeycomb metal structure 1 may include operation S10 for preparing a honeycomb structure 15 including at least one substrate 10 including Fe, operation S20 for coating at least a part of the substrate 10 with a viscid material 32 whose viscosity is increased by moisture W, operation S30 for attaching metal powder 31 onto the viscid material 32, operation S40 for adhering the metal powder 31 to the substrate 10 by supplying the moisture W to the viscid material 32, and operation S50 for generating an uneven structure 30 made of the metal powder 31 bonded to the substrate 10, by performing heat treatment on the substrate 10 to which the metal powder 31 is adhered.

Initially, the honeycomb structure 15 including at least one substrate 10 including Fe may be prepared in a crucible. The honeycomb structure 15 is a beehive structure of one or more substrates 10, and the substrates 10 may be spaced apart from each other in the honeycomb structure 15. The substrate 10 of the honeycomb structure 15 provides an attachment location of the metal powder 31, and is heat-treated in a subsequent operation while the metal powder 31 is attached thereto. The honeycomb structure 15 may be horizontally or vertically prepared in the crucible.

For example, the substrate 10 including Fe may be made of SUS430 stainless steel. Since SUS430 stainless steel contains 16 wt % to 18 wt % of Cr, a Fe—Cr—Al metal substrate having heat resistance may be manufactured by including several wt % of Al in the SUS430 substrate without a change in shape. However, the present invention is not limited thereto.

Then, the operation S20 for coating at least a part of the substrate 10 with the viscid material 32 whose viscosity is increased by the moisture W is performed. The viscid material 32 may be of a type commonly usable in the technical field of the present invention. The viscid material 32 may include at least one selected from the group consisting of polyvinyl alcohol (PVA), polyethylene (PE), polypropylene (PP), polystyrene (PS), polyethylene glycol (PEG), polymethyl methacrylate (PMMA), polyoxymethylene (POM), polyacrylic acid (PAA), and styrene-butadiene rubber carboxymethyl cellulose, or a combination thereof. Specifically, the viscid material 32 may be PVA. The viscid material 32 may be uniformly generated on the honeycomb structure 15 by coating and then drying the viscid material 32. Thereafter, since the viscid material 32 is not sufficient to attach the metal powder 31 onto the substrate 10, a force of adhesion may be increased by supplying the moisture W to the viscid material 32. The viscid material 32 may be easily removed by heat treatment, and thus may be coated by a small amount to temporarily attach the metal powder 31 to the substrate 10. The coated viscid material 32 may generate a viscid layer on at least a part of the substrate 10.

The viscid material 32 may be uniformly coated on a top surface of the substrate 10, and may be coated on top and bottom surfaces of the substrate 10. The viscid material 32 may be coated by a necessary amount based on the use of the honeycomb metal structure 1 by selecting a region of the substrate 10 on which the uneven structure 30 is to be generated. Specifically, the viscid material 32 may be uniformly coated on the top and bottom surfaces of the substrate 10 to generate a coated layer. In this case, the viscid material 32 may be coated on the top and bottom surfaces of the substrate 10 by spraying the viscid material 32 onto the honeycomb structure 15. Specifically, the viscid material 32 may be uniformly coated on the substrate 10 by dipping the honeycomb structure 15 in a container of a solution of the viscid material 32.

The operation S30 for attaching the metal powder 31 onto the viscid material 32 and the operation S40 for adhering the metal powder 31 to the substrate 10 will now be described.

Initially, multiple layers of the metal powder 31 are stacked and loaded to cover an empty space of the honeycomb structure 15 including the substrate 10 coated with the viscid material 32. The metal powder 31 is provided to sufficiently fill the empty space of the honeycomb structure 15. As illustrated in FIG. 3, when the metal powder 31 sufficiently fills the empty space of the honeycomb structure 15, some metal powder 31a is in direct contact with the substrate 10, and thus is also in contact with the viscid material 32 previously coated on the substrate 10. The other metal powder 31b is stacked on the metal powder 31a which is in direct contact with the substrate 10, and thus is not in direct contact with the substrate 10.

The metal powder 31 is adhered to the substrate 10 by supplying the moisture W to the viscid material 32. The viscid material 32 has a force of adhesion lower than that of a general adhesive agent. However, when the moisture W is supplied, the viscosity of the viscid material 32 may be increased and thus a sufficient force of adhesion may be achieved to adhere the metal powder 31 to the substrate 10.

A honeycomb is a complex structure and has hundreds of gas channels (or holes) each having a small cross-sectional area. Spray glue may be used to attach metal powder onto a substrate. However, the spray glue may not be coated to inside of the gas passages of the honeycomb. As such, a liquid adhesive agent may be used and coated. However, the liquid adhesive agent moves in the direction of gravity. As a result, the liquid adhesive agent may not be uniformly distributed on the honeycomb, the metal powder may not be uniformly attached, and thus an uneven structure having a uniform thickness may not be generated.

Therefore, to solve the above problem, according to the present invention, the viscid material 32 may be coated and partially dried, and then a force of adhesion may be increased by supplying the moisture W to the viscid material 32. When the viscid material 32 is coated and dried, although the honeycomb structure 15 has a complex structure, the dried viscid material 32 may be uniformly coated. In addition, when the metal powder 31 is attached to the uniformly coated viscid material 32 and the force of adhesion is increased by supplying the moisture W to the viscid material 32, a monolayer of the metal powder 31a directly adhered to the viscid material 32 may be uniformly adhered to the honeycomb structure 15.

Figure 4:
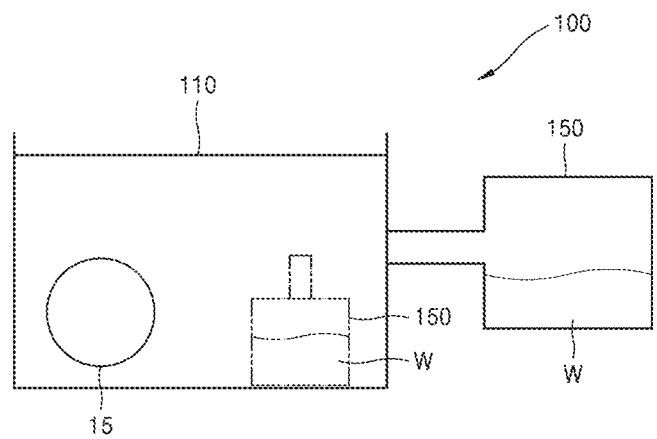
FIG. 4 is a cross-sectional view of an apparatus for adhering metal powder, according to an embodiment of the present invention.
Figure 5:
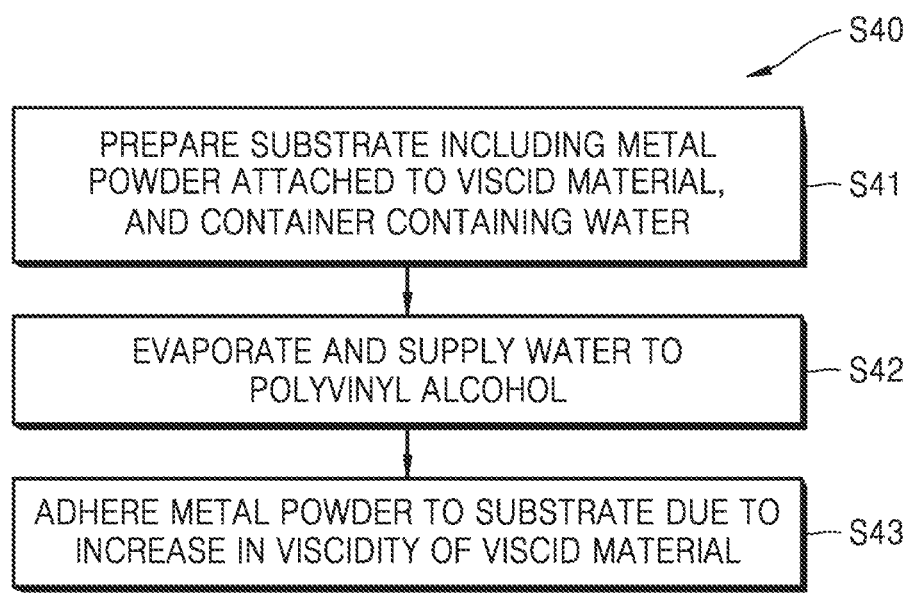
FIG. 5 is a flowchart of a method of adhering the metal powder to a substrate, according to an embodiment of the present invention.
Figure 6:
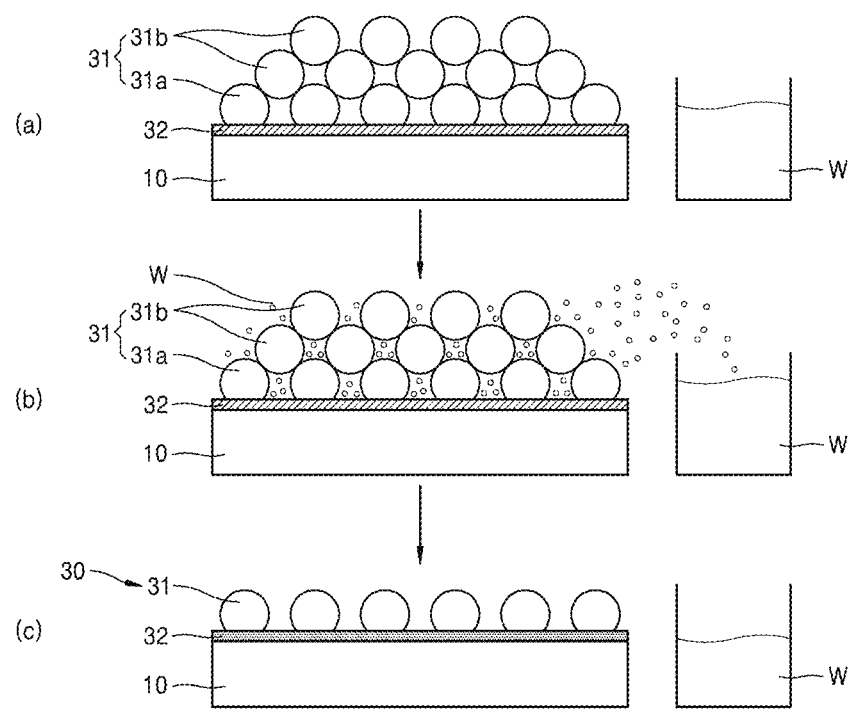
FIG. 6 illustrates cross-sectional views for describing the method of adhering the metal powder to the substrate, according to an embodiment of the present invention.

FIG. 4 is a cross-sectional view of an apparatus 100 for adhering the metal powder 31 to the substrate 10, according to an embodiment of the present invention, and FIGS. 5 and 6 illustrate a detailed flowchart of and cross-sectional views for describing the operation S40 for adhering the metal powder 31 to the substrate 10.

Referring to FIG. 4, the apparatus 100 includes a chamber 110 accommodating the honeycomb structure 15 filled with the metal powder 31, and a moisture supplier 150 capable of supplying the moisture W. As illustrated in FIG. 4, the moisture supplier 150 may be provided outside the chamber 110 to supply the moisture W into the chamber 110. However, the moisture supplier 150 is not limited thereto. As another example, the moisture supplier 150 may be provided inside the chamber 110 to provide the moisture W. The chamber 110 may have a sealable structure. In a sealed space, the moisture W may be effectively supplied to the viscid material 32 of the substrate 10.

According to FIGS. 5 and 6, the operation S40 for adhering the metal powder 31 may include operation S41 for preparing the substrate 10 including the metal powder 31 attached to the viscid material 32, and the moisture supplier 150 capable of supplying the moisture W, operation S42 for evaporating and supplying the moisture W to the viscid material 32, and operation S43 for adhering the metal powder 31 to the substrate 10 due to an increase in viscosity of the viscid material 32.

Initially, to supply the moisture W to the viscid material 32, the honeycomb structure 15 and the moisture supplier 150 containing water are prepared in the chamber 110 of the apparatus 100 (S41). The chamber 110 of the apparatus 100 may be sealed to effectively supply the moisture W to the viscid material 32. The moisture supplier 150 may be prepared inside the chamber 110, or may be connected from outside the chamber 110.

Then, the moisture W contained in the moisture supplier 150 is evaporated and adhered to the viscid material 32 of the honeycomb structure 15 (S42). Since the viscid material 32 is capable of absorbing the moisture W, the viscid material 32 absorbs the moisture W supplied from the moisture supplier 150 and thus the viscosity thereof is increased. In the metal powder 31 filled in the empty space of the honeycomb structure 15, the metal powder 31a directly attached to the viscid material 32 may be adhered to the substrate 10 due to the increased viscosity of the viscid material 32. The metal powder 31b stacked on the metal powder 31a may be easily detached from the honeycomb structure 15. Since the metal powder 31 is coated to fill the empty space of the honeycomb structure 15, the metal powder 31 is uniformly adhered to the substrate 10.

To remove the metal powder 31b not adhered to inner walls of the honeycomb structure 15, the honeycomb structure 15 is lightly beaten. Since the metal powder 31 is loosely filled in the honeycomb structure 15, the not-adhered metal powder 31b may be easily removed by small impact. As such, a monolayer of the metal powder 31a may be adhered to the substrate 10 of the honeycomb structure 15.

According to an embodiment of the present invention, the metal powder 31 may include Al powder or Al-silicon (Si) alloy powder.

By using alloy powder including Al to manufacture the honeycomb metal structure 1, the uneven structure 30 may be generated on the substrate 10 and, at the same time, heat resistance characteristics may be provided to the substrate 10 including Fe, by adding Al or Si.

In the Al—Si alloy powder, the content of Al may be adjusted based on a particle size of the Al—Si alloy powder, a thickness of the substrate 10 including Fe, or the like. According to an embodiment, the Al—Si alloy powder may contain Si by equal to or greater than 0.1 wt % and equal to or less than 40 wt %, and contain Al by the remaining wt %. However, embodiments of the present invention are not limited thereto. When the content of Si increases, liquidus temperature of the Al—Si alloy rises and thus heat treatment temperature increases.

The operation S50 for generating the uneven structure 30 made of the metal powder 31 bonded to the substrate 10, performing heat treatment on the substrate 10 to which a monolayer of the metal powder 31 is adhered will now be described.

According to a conventional method of generating an uneven structure on a substrate, the uneven structure is generated by scattering Fe—Cr—Al powder over a Fe—Cr—Al substrate and bonding the powder with the substrate by solid state diffusion. However, when the Fe—Cr—Al powder is scattered over the substrate, since the powder is not fixed, the substrate may not be easily handled before sintering. To solve the above problem, the metal powder 31 is adhered to the substrate 10 (S40) for easy handling of the substrate 10 before sintering, and then the uneven structure 30 is generated by performing heat treatment. In this case, the heat treatment may be performed by horizontally providing the substrate 10 in such a manner that a surface of the substrate 10, to which the metal powder 31 is attached, faces upward, or may be performed by vertically providing the substrate 10 when the metal powder 31 is attached to two surfaces of the substrate 10.

According to an embodiment of the present invention, the heat treatment may include an operation for generating an intermetallic compound layer 20 at an interface between the substrate 10 and the metal powder 31 by performing first heat treatment on the substrate 10 to which the metal powder 31 is adhered, and an operation for dissolving the intermetallic compound layer 20 by performing second heat treatment on the first-heat-treated substrate 10.

The first heat treatment will now be described. At a temperature equal to or higher than a melting point, the metal powder 31 may become a liquid phase and may react with a metal element included in the substrate 10 to generate an intermetallic compound. The metal powder 31 after reaction due to the first heat treatment may mostly include the intermetallic compound and, at the same time, generates the intermetallic compound layer 20 at the interface between the metal powder 31 and the substrate 10. The metal powder 31 is fixed by the intermetallic compound layer 20 adjacent thereto, thereby generating the uneven structure 30.

The first heat treatment may be performed for 1 minute to 4 hours at a heating temperature $T_H$ satisfying Eq. (1).

$$Tm \leq T_H \leq 1.3 * Tm \qquad \text{Eq. (1):}$$

(where Tm denotes a melting point of the metal powder 31, and a unit thereof is absolute temperature (K).)

The melting point Tm of the metal powder 31 including Al or an Al—Si alloy may vary depending on the content of Al. The uneven structure 30 and the intermetallic compound layer 20 including the intermetallic compound may be generated within a short time by performing the first heat treatment at a temperature higher than the melting point Tm of the metal powder 31, which is determined based on the content of Al.

According to an embodiment of the present invention, the intermetallic compound layer 20 may include aluminide or silicide. For example, the aluminide may include $Fe_3Al$, $FeAl$, $FeAl_2$, or $Fe_2Al_5$ which is a Fe—Al intermetallic compound, and the silicide may include $FeSi$, $Fe_3Si$, or $FeSi_2$ which is a Fe—Si intermetallic compound.

A Fe—Al binary phase diagram shows a large number of stable aluminide compounds, and the intermetallic compound layer 20 generated due to reaction between the substrate 10 including Fe and the metal powder 31 attached onto the substrate 10 and including Al may include an aluminide layer.

The intermetallic compound layer 20 including the aluminide or the silicide may have a thickness equal to or less than 100 μm. When the intermetallic compound layer 20 has a thickness greater than, specifically, 100 μm, since a thermal expansion coefficient thereof differs from that of the substrate 10, cracks may occur in the intermetallic compound layer 20 having a high brittleness and small pieces thereof may be detached in a thermal history test at high temperature and room temperature. Therefore, the thickness of the intermetallic compound layer 20 needs to be adjusted to be equal to or less than 100 μm.

According to an embodiment of the present invention, the heat treatment may include an operation for removing the viscid material 32.

The viscid material 32 is required to temporarily adhere the metal powder 31 onto the substrate 10, and is coated by a small amount on at least a part of the substrate 10. A principal component of the viscid material 32 may include a polymeric material. In general, the polymeric material may be easily removed at a temperature of heat treatment performed to sinter metal. By removing a foreign substance from the honeycomb metal structure 1 by removing the viscid material 32, the uneven structure 30 may be generated in the same manner of directly sintering the metal powder 31.

According to another embodiment of the present invention, a catalyst module may be manufactured by generating a porous support layer on the substrate 10 including the uneven structure 30 generated by performing only the first heat treatment. In a catalyst module used in a not-rapid temperature variation environment or at a low or constant temperature, thermal stress is small and thus cracks do not occur in the intermetallic compound layer 20. Therefore, only the first heat treatment may be performed and the honeycomb metal structure 1 may be used without dissolving the intermetallic compound layer 20. However, the present invention is not limited thereto.

The second heat treatment will now be described. The intermetallic compound layer 20 may be dissolved by performing the second heat treatment on the first-heat-treated substrate 10. The intermetallic compound layer 20 generated due to the first heat treatment has a high brittleness and has a thermal expansion coefficient different from that of the substrate 10, the intermetallic compound layer 20 may have cracks and be detached from the substrate 10 in a rapid temperature variation environment. This means, when a catalyst module is manufactured using a metal structure including the intermetallic compound layer 20, catalyst components on the surface of the metal catalyst module may be detached due to detachment of a porous support layer and cracks of the intermetallic compound layer 20 in a rapid temperature variation environment. Therefore, to prevent cracks of the intermetallic compound layer 20, the intermetallic compound layer 20 may be dissolved by performing the second heat treatment at a temperature higher than that of the first heat treatment.

When the first heat treatment is performed, the uneven structure 30 and the intermetallic compound layer 20 including the intermetallic compound are fixed to the substrate 10. In the uneven structure 30 and the intermetallic compound layer 20, a concentration of Al or Si is higher than that in the substrate 10, and a concentration of Fe is lower than that in the substrate 10. Therefore, when the second heat treatment is performed at high temperature, the intermetallic compound of the uneven structure 30, and metal elements in the intermetallic compound layer 20 and the substrate 10 may mutually diffuse due to a concentration gradient and thus the intermetallic compound layer 20 may be dissolved. In this case, the uneven structure 30 is generated on the substrate 10 by hardly changing a shape of the uneven structure 30 including the intermetallic compound. By performing the second heat treatment, the intermetallic compound layer 20 capable of causing cracks thereof in a rapid temperature variation environment may be dissolved and the honeycomb metal structure 1 including the uneven structure 30 generated on the substrate 10 may be manufactured. The honeycomb metal structure 1 may prevent occurrence of cracks due to a difference in thermal expansion coefficient and thus achieve high heat resistance characteristics under a rapid temperature variation condition.

A temperature and a time of the second heat treatment for dissolving the intermetallic compound layer 20 may vary depending on a particle size and a composition of the metal powder 31. The time of the second heat treatment is increased in proportion to the particle size of the metal powder 31 used to generate the uneven structure 30, and in inverse proportion to the temperature of the second heat treatment.

According to an embodiment of the present invention, the second heat treatment may be performed at 900° C. to 1,200° C. for 10 hours to 36 hours. In addition, according to an embodiment of the present invention, the heat treatment may be performed in an inert gas or reducing gas atmosphere. However, embodiments of the present invention are not limited thereto.

Depending on the particle size and the composition of the metal powder 31, the size of the uneven structure 30 including the metal powder 31 may vary. In addition, since the uneven structure 30 and the intermetallic compound layer 20 including the intermetallic compound are generated due to reaction between the metal powder 31 and Fe of the substrate 10, a thickness and a composition of the intermetallic compound layer 20 may vary. Therefore, a heating temperature and a heating time of the second heat treatment may vary depending on the thickness and the composition of the intermetallic compound layer 20 to dissolve the intermetallic compound layer 20. When the particle size of the metal powder 31 is increased, a long heating time may be required until a solute metal included in the intermetallic compound layer 20 is diffused and permeates into a solvent metal. That is, a time and a temperature of heat treatment for dissolving the intermetallic compound layer 20 may be increased in proportion to the particle size of the metal powder 31.

According to an embodiment of the present invention, the first heat treatment and the second heat treatment may be performed consecutively. The second heat treatment is performed at a temperature higher than that of the first heat treatment to dissolve the intermetallic compound layer 20. That is, while the substrate 10 to which the metal powder 31 is attached is being heated to the temperature of the second heat treatment, the first heat treatment may be performed at a temperature equal to or higher than the melting point of the metal powder 31. In this case, the intermetallic compound layer 20 may be generated. Subsequently, the second heat treatment may be performed to dissolve the intermetallic compound layer 20 and generate the uneven structure 30 on the substrate 10. The first heat treatment and the second heat treatment may be consecutively performed in the same heat treatment device. When heating is performed and temperature is increased to perform the first heat treatment, the first heat treatment may be performed at a temperature equal to or higher than the melting point of the metal powder 31, and the second heat treatment may be performed by continuously increasing the temperature.

As another example, the first heat treatment and the second heat treatment may be separately performed at a temporal interval. For example, the first heat treatment and the second heat treatment may be performed in different devices based on heat treatment temperatures. After the first heat treatment is performed, since the metal powder 31 generates the intermetallic compound and is fixed and thus the substrate 10 including the uneven structure 30 may be easily handled, the substrate 10 may be cooled and then the second heat treatment may be performed.

Referring to FIG. 3, the heat treatment may further include an operation for generating voids 70 in a region where the substrate 10 and the uneven structure 30 are in contact with each other.

In the heat treatment, metal elements (e.g., Fe, Cr, and nickel (Ni)) included in the substrate 10 and Al or Si included in the intermetallic compound layer 20 mutually diffuse. Fe, Cr, and Ni of the substrate 10 move toward the metal powder 31, and Al or Si moves toward the substrate 10. A difference in diffusion velocity is present between the metal elements which are diffused in opposite directions. Due to the difference in diffusion velocity, the voids 70 are generated in the substrate 10 in the region in contact with the metal powder 31 based on the Kirkendall effect. This means that outward diffusion of the metals included in the substrate 10, toward the metal powder 31 has occurred more actively than inward diffusion from the metal powder 31 toward the substrate 10. As such, heat resistance may be increased without changing a shape of the uneven structure 30. The heat resistance may be increased due to diffusion of Al or Si of the metal powder 31 toward the substrate 10.

Figure 7:
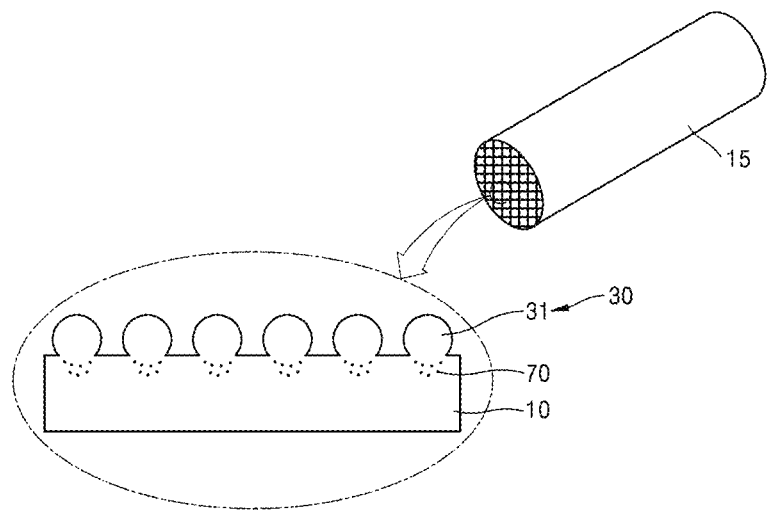
FIG. 7 is a cross-sectional view of the substrate including an uneven structure of the honeycomb metal structure, according to an embodiment of the present invention.

FIG. 7 is a cross-sectional view of the substrate 10 including the uneven structure 30 of the honeycomb metal structure 1, according to an embodiment of the present invention. FIG. 7 is a magnified view of a part of the honeycomb metal structure 1 including the uneven structure 30 generated on the honeycomb structure 15.

Referring to FIG. 7, the honeycomb metal structure 1 according to an embodiment of the present invention may include the honeycomb structure 15 including at least one substrate 10 including Fe, and the uneven structure 30 generated on at least one surface of the substrate 10, wherein the uneven structure 30 may be made of metal, and wherein the voids 70 may be generated in a region where the substrate 10 and the uneven structure 30 are in contact with each other.

The intermetallic compound layer 20 is dissolved into the substrate 10 by performing high-temperature heat treatment, and the metal powder 31 adhered to the substrate 10 generates the uneven structure 30. In some cases, the voids 70 may be generated in the substrate 10 due to outward diffusion of metal atoms included in the substrate 10. A force of attachment to a porous support layer to be coated on the substrate 10 may be increased using the uneven structure 30, and heat resistance characteristics of the honeycomb metal structure 1 may be increased by preventing cracks of the uneven structure 30 including the intermetallic compound and the intermetallic compound layer 20 due to a difference in thermal expansion coefficient. Although the uneven structure 30 is generated only on the top surface of the substrate 10 in FIG. 6, the present invention is not limited thereto. When the viscid material 32 is coated on the top and bottom surfaces of the substrate 10 and the metal powder 31 is attached thereto, the uneven structure 30 may be generated on the two surfaces of the substrate 10.

A honeycomb metal catalyst module 2 will now be described with reference to FIG. 8.

Figure 8:
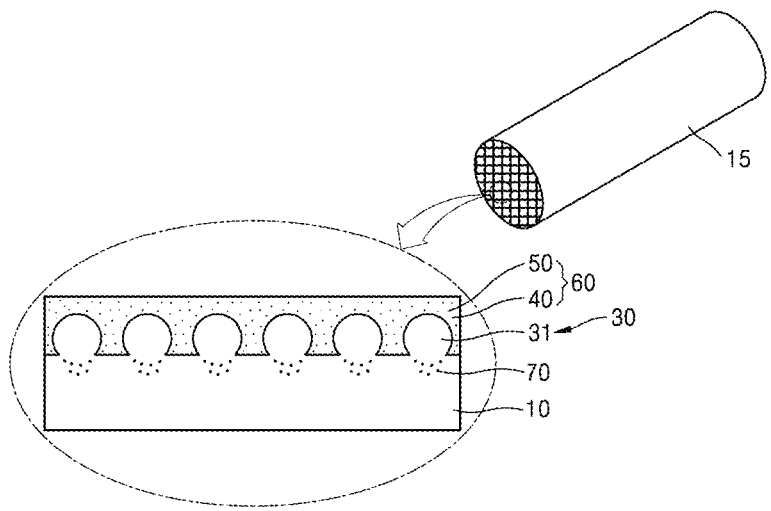
FIG. 8 is a cross-sectional view of a metal catalyst module including a metal structure, according to an embodiment of the present invention.

FIG. 8 is a cross-sectional view of the substrate 10 of the honeycomb metal catalyst module 2, according to an embodiment of the present invention. FIG. 8 is a magnified view of a part of the honeycomb metal catalyst module 2 including the uneven structure 30 generated on the honeycomb structure 15.

The honeycomb metal catalyst module 2 according to an embodiment of the present invention may include the honeycomb structure 15 including at least one substrate 10 including Fe, the uneven structure 30 generated on at least one surface of the substrate 10, and a catalyst layer 60 coated on the uneven structure 30, wherein the uneven structure 30 may be made of metal, and wherein the voids 70 may be generated in a region where the substrate 10 and the uneven structure 30 are in contact with each other.

Referring to FIGS. 7 and 8, the honeycomb metal catalyst module 2 may include the honeycomb metal structure 1 including the uneven structure 30 generated on the substrate 10. In the honeycomb metal catalyst module 2, the catalyst layer 60 is coated on the uneven structure 30 of the substrate 10. The catalyst layer 60 may include a porous support layer 40, and a metal catalyst 50 included in the porous support layer 40.

To manufacture the honeycomb metal catalyst module 2, initially, the porous support layer 40 may be coated on a surface of the substrate 10 including the uneven structure 30 of the honeycomb metal structure 1. The porous support layer 40 may include at least one component selected from the group consisting of γ-alumina ($Al_2O_3$), silica ($SiO_2$), titania ($TiO_2$), zeolite, ceria ($Ce_2O_3$), magnesia (MgO), vanadate ($V_{2O5}$), cobalt oxide (CoOx), iron oxide (FeOx), tungsten oxide ($WO_3$), molybdenum oxide ($MoO_3$), antimony oxide ($SbO_2$), and rare earth oxides (e.g., scandium (Sc), yttrium (Y), and lanthanum (La)-based oxides).

To coat the porous support layer 40, porous support particles may be wash-coated. A particle size, a slurry concentration, and a solvent of a porous support component for wash coating may be determined based on a general wash coating process. To increase a coating effect of the porous support layer 40, porous support slurry may include an additive such as a surfactant or a binder.

The porous support layer 40 may be densely generated to provide a coated layer on the surface of the substrate 10 including the uneven structure 30. Specifically, the porous support layer 40 may be generated on the surface of the substrate 10 within a thickness range of 10 μm to 100 μm.

Then, components (e.g., moisture and the binder) included in the porous support layer 40 are removed by heating the honeycomb metal structure 1 including the porous support layer 40. In this process, the porous support component is partially sintered and adhered to the surface of the substrate 10, and the porous support layer 40 is cracked at an interval of several μm to several hundred μm. At this time, when a heating temperature is excessively high, sintering occurs in the porous support layer 40 itself and thus a specific surface area of the porous support layer 40 is reduced. Thus, heating is performed at a temperature equal to or lower than, specifically, 900° C. Otherwise, when the heating temperature is excessively low, moisture or the additive such as the binder is not easily removed. Thus, heating is performed at a temperature equal to or higher than, specifically, 150° C. As such, since the porous support layer 40 generated on the honeycomb metal structure 1 is attached to the uneven structure 30, a force of attachment may be constantly maintained after being exposed to a high-temperature catalyst use environment.

After the porous support layer 40 is generated, the honeycomb metal catalyst module 2 is manufactured by impregnating the porous support layer 40 with the metal catalyst 50. The metal catalyst 50 impregnated in the porous support layer 40 may include a generally used metal catalyst such as a precious metal or a transition element. To impregnate the porous support layer 40 with the metal catalyst 50, the honeycomb metal structure 1 including the porous support layer 40 may be dipped into a solution of the metal catalyst 50 and the solution may permeate into the porous support layer 40, or the honeycomb metal structure 1 including the porous support layer 40 may be dipped into slurry of the metal catalyst 50 and the metal catalyst 50 may move into the porous support layer 40. Alternatively, the honeycomb metal catalyst module 2 may be manufactured by generating the porous support layer 40 in which the metal catalyst 50 is uniformly distributed, and coating the porous support layer 40 on the honeycomb metal structure 1 including the uneven structure 30.

Test Examples

Test examples for facilitating understanding of the present invention will now be described. However, the following test examples are provided only for a better understanding of the present invention, and embodiments of the present invention are not limited thereto.

A honeycomb metal structure including a SUS430 honeycomb structure and an uneven structure generated using Al powder, and a honeycomb metal catalyst module including the honeycomb metal structure will now be described with reference to FIGS. 9, 10, 11A and 11B, and 12.

Figure 9:
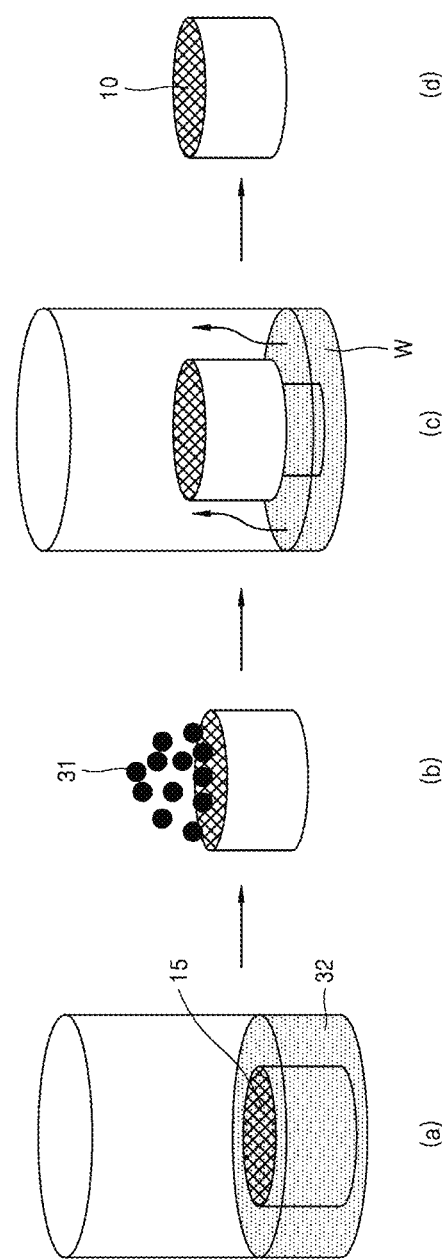
FIGS. 9 and 10 are perspective views and images for describing a method of manufacturing a honeycomb metal structure, according to a test example of the present invention.
Figure 10:
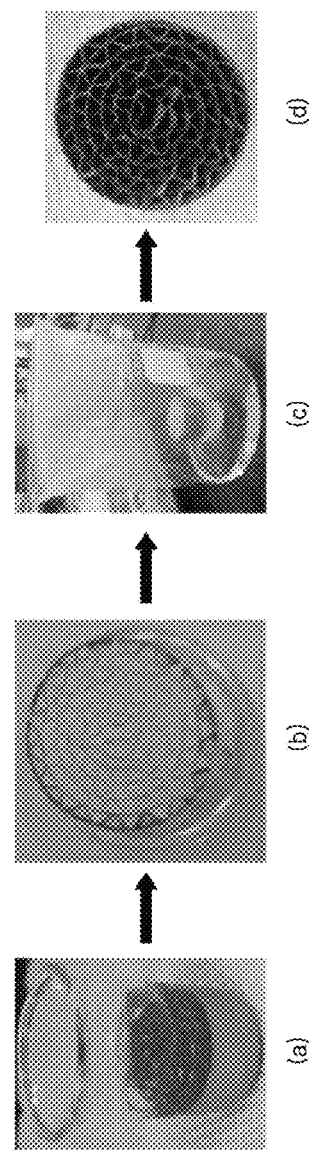

FIGS. 9 and 10 are perspective views and images for describing a method of manufacturing a honeycomb metal structure, according to a test example of the present invention. Referring to FIGS. 9 and 10, in the present test example, a SUS430 stainless steel substrate is used as a substrate of a honeycomb structure. Since SUS430 stainless steel contains 16 wt % to 18 wt % of Cr, a Fe—Cr—Al metal substrate having heat resistance may be manufactured by adding several wt % of Al in the SUS430 substrate without a change in shape. A cylindrical honeycomb structure having a diameter d of 3 cm and a height h of 1.5 cm is used, and Al powder is prepared as metal powder.

Initially, a viscid material is coated on the honeycomb structure. The honeycomb structure is dipped in a container containing PVA at a concentration of 2% to 5% (see (a) of FIG. 9 and (a) of FIG. 10), and then is drained and dried.

The Al powder having a particle size of 38 μm to 63 μm is filled in an empty space of the dried honeycomb structure (see (b) of FIG. 9 and (b) of FIG. 10), and the honeycomb structure is put on a holder in a beaker containing water and an opening of the beaker is sealed with plastic (see (c) of FIG. 9 and (c) of FIG. 10). When water is evaporated by laying the honeycomb structure at room temperature for about 1 hour, viscidity of PVA is increased and thus the Al powder is adhered to the substrate of the honeycomb structure. Then, the honeycomb structure is taken out and the Al powder which is not adhered is removed (see (d) of FIG. 9 and (d) of FIG. 10). The Al powder is loosely filled in the empty space of the honeycomb structure, and thus may be removed by applying small force.

Thereafter, the SUS430 honeycomb structure to which the Al powder is adhered is heat treated in an argon (Ar) atmosphere at 1,000° C. for 9 hours. Since a melting point of the Al powder is 660° C., when heat treatment is performed at 1,000° C. higher than the melting point, Fe of SUS430 may react with Al and an aluminide layer may be generated. The aluminide layer is dissolved by consecutively performing first heat treatment and second heat treatment at 1,000° C., and an inner side of the honeycomb structure is cleaned using an air compressor gun. A SUS430 honeycomb metal structure including an uneven structure made of Al powder is manufactured and called 'test example 1'. [Table 1] shows variations in weight of the honeycomb structure in a manufacturing process of the test example 1.

TABLE 1

| Weight (g) before reaction | | | | Weight (g) after reaction | |
|---|---|---|---|---|---|
| SUS430 honeycomb structure | PVA coat | Al powder | Total | Immediately after heat treatment | After cleaned using air compressor gun |
| 10.2742 | 0.0111 | 0.4842 | 10.7695 | 10.9090 | 10.8106 |

Referring to [Table 1], when heat treatment is performed in an Ar atmosphere, the honeycomb metal structure is generated and the weight is increased. This means that the Al powder is partially oxidized. When the inner side of the honeycomb structure is cleaned using an air compressor gun, the Al powder which is not adhered is removed, the weight is reduced.

After that, a γ-alumina porous support layer is generated on the substrate of the honeycomb structure of the test example 1. 40 g of γ-alumina ($γ-Al_2O_3$) is mixed with 60 g of distilled water and then is milled using a wet mill (e.g., an attrition mill) to a particle size of 50 nm to 100 nm, thereby producing slurry. The test example 1 is dipped in the produced slurry and is taken out, and the slurry remaining on the surface of the test example 1 is removed by blowing compressed air. Thereafter, the test example 1 is dried at 120° C. for 1 hour to measure a weight of a coated γ-alumina support layer, and then is baked at 750° C. for 2 hours to generate a porous support layer. Lastly, the γ-alumina support layer is impregnated with a metal catalyst to manufacture a metal catalyst module which is called 'test example 2'.

Figure 11A:
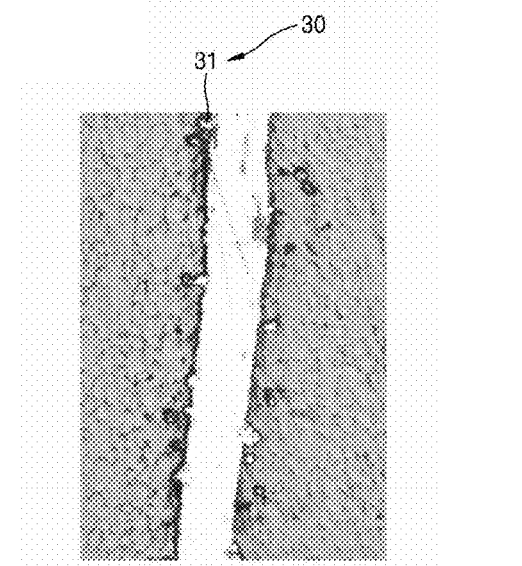
FIGS. 11A and 11B are scanning electron microscope (SEM) images of cross-sections of a SUS430 honeycomb metal structure including an uneven structure made of aluminum (Al) powder, according to a test example of the present invention.
Figure 11B:
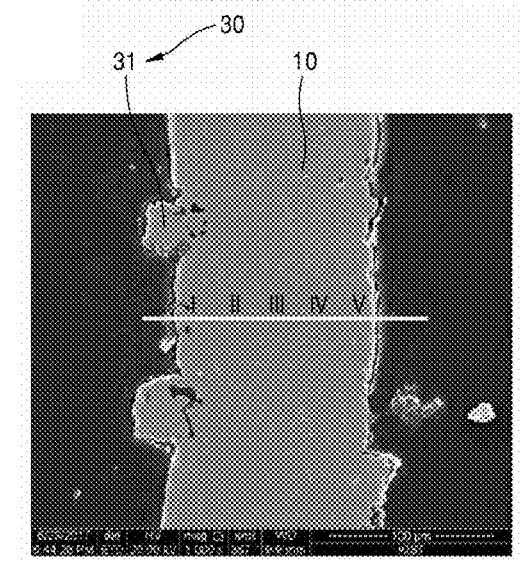

FIGS. 11A and 11B are scanning electron microscope (SEM) images of cross-sections of a SUS430 honeycomb metal structure including an uneven structure made of Al powder, according to a test example of the present invention.

The heat-treated test example 1 is cut and a cross-section thereof is observed. Referring to FIG. 11A, in the SUS430 honeycomb metal structure of the test example 1, the uneven structure made of the Al powder is generated on both surfaces of a substrate. Rough surfaces due to the uneven structure are shown. It is shown that an aluminide layer generated due to heat treatment is dissolved and the uneven structure is firmly fixed to the substrate.

Referring to FIG. 11B, it is shown that the voids 70 are generated in a region where the uneven structure of the test example 1 is generated. While heat treatment is being performed at 1000° C., Fe, Cr, and Ni included in the SUS430 substrate move toward the Al powder, and Al of the Al powder moves toward the substrate. In this case, since Fe, Cr, and Ni have higher mobility, larger amounts of Fe, Cr, and Ni move and are diffused outward. That is, the voids are generated in the substrate due to outward diffusion, and the Al powder generates the uneven structure due to dissolution of the aluminide layer. [Table 2] shows the content of Al in regions shown in FIG. 11B based on energy dispersive x-ray analysis (EDX).

TABLE 2

| Location | I | II | III | IV | V |
|---|---|---|---|---|---|
| Al (wt. %) | 3.63 | 3.48 | 3.29 | 3.12 | 3.45 |

Referring to FIG. 11B and [Table 2], it is shown that the content of Al in the SUS430 substrate is increased. This means that, in the honeycomb metal structure of the present invention, the Al powder is diffused into the substrate due to heat treatment. An intermetallic compound may be generated due to rapid reaction between metal elements of the substrate and the Al powder during heat treatment. In addition, when the aluminide layer generated at an interface between the Al powder and the SUS430 substrate is dissolved, the Al powder generates the uneven structure without a change in shape.

Figure 12:
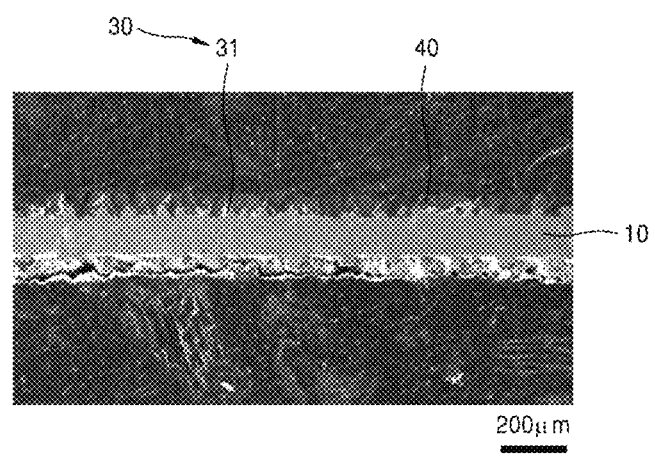
FIG. 12 is a SEM image of a cross-section of a SUS430 honeycomb metal structure including a porous support layer, according to a test example of the present invention.

FIG. 12 is a SEM image of a cross-section of a SUS430 honeycomb metal structure including a porous support layer, according to a test example of the present invention.

FIG. 12 is a SEM image of a cross-section of a middle portion of the honeycomb metal catalyst module of the test example 2. It is shown that an uneven structure is properly generated to the middle portion of a substrate of the honeycomb metal structure, and thus porous γ-alumina is properly attached thereto.

The honeycomb metal structure 1 of the present invention may increase a force of attachment of the porous support layer 40 generated on the substrate 10 and may increase heat resistance characteristics to suppress surface variations in a rapid temperature variation environment, by generating the uneven structure 30 on the surface of the substrate 10 and performing heat treatment to dissolve the intermetallic compound layer 20.

As described above, according to an embodiment of the present invention, a honeycomb metal structure manufactured by generating an uneven structure on a metal substrate of a honeycomb structure, by using Al powder, and performing heat treatment may have high heat resistance characteristics.

In addition, according to the present invention, a catalyst module including the honeycomb metal structure may increase a force of attachment to prevent a porous support layer from being easily detached due to the uneven structure, and achieve heat resistance characteristics to prevent surface variations of the catalyst module in a rapidly variable heat treatment environment.

However, the scope of the present invention is not limited to the above effects. While the present invention has been particularly shown and described with reference to embodiments thereof, it will be understood by one of ordinary skill in the art that various changes in form and details may be made therein without departing from the scope of the present invention as defined by the following claims.

What is claimed is:

1. A method of manufacturing a honeycomb metal structure, comprising:
    providing a substrate comprising iron (Fe) and a container containing water;
    coating at least a part of the substrate with a viscid material whose viscosity is increased by moisture;
    attaching metal powder onto the viscid material;
    adhering the metal powder to the substrate due to an increase in viscosity of the viscid material by evaporating a portion of the water in the container and supplying moisture to the viscid material; and
    generating an uneven structure made of the metal powder bonded to the substrate by performing a heat treatment on the substrate to which the metal powder is adhered.

2. The method of claim 1, wherein the heat treatment further comprises generating voids in a region where the substrate and the uneven structure are in contact with each other.

3. The method of claim 1, wherein the heat treatment comprises removing the viscid material.

4. The method of claim 1, wherein the viscid material comprises at least one material selected from the group consisting of polyvinyl alcohol (PVA), polyethylene (PE), polypropylene (PP), polystyrene (PS), polyethylene glycol (PEG), polymethyl methacrylate (PMMA), polyoxymethylene (POM), polyacrylic acid (PAA), and styrene-butadiene rubber, carboxymethyl cellulose, or a combination thereof.

5. The method of claim 1, wherein the metal powder comprises aluminum (Al) powder or Al-silicon (Si) alloy powder.

6. The method of claim 1, wherein the heat treatment is performed in an atmosphere comprising an inert gas or a reducing gas.

7. The method of claim 1, wherein the heat treatment comprises:
    performing a first heat treatment on the substrate to which the metal powder is adhered to generate an intermetallic layer at an interface between the substrate and the metal powder; and
    performing a second heat treatment on the substrate to dissolve the intermetallic compound layer.

8. The method of claim 7, wherein the first heat treatment is performed for a time ranging from 1 minute to 4 hours at a heating temperature, $T_H$, satisfying Inequality 1 below:

$$Tm \geq T_H \geq 1.3 * Tm,$$

where Tm denotes a melting point of the metal powder, and a unit thereof is absolute temperature (K).

9. The method of claim 7, wherein the intermetallic compound layer comprises an aluminide or a silicide.

10. The method of claim 7, wherein the second heat treatment is performed at a temperature ranging from 900° C. to 1,200° C. for a time ranging from 10 hours to 36 hours.

11. A method of manufacturing a honeycomb metal structure, comprising:
    preparing a honeycomb structure comprised of a substrate comprising iron (Fe);
    coating at least a part of the substrate with a viscid material whose viscosity is increased by moisture;
    attaching metal powder onto the viscid material;
    adhering the metal powder to the substrate by supplying moisture to the viscid material; and
    generating an uneven structure made of the metal powder bonded to the substrate, by performing heat treatment on the substrate to which the metal powder is adhered,
    wherein the heat treatment comprises:
    performing a first heat treatment on the substrate to which the metal powder is adhered to generate an intermetallic layer at an interface between the substrate and the metal powder; and
    performing a second heat treatment on the substrate to dissolve the intermetallic compound layer.

12. The method of claim 11, wherein the first heat treatment is performed for a time ranging from 1 minute to 4 hours at a heating temperature, $T_H$, satisfying Inequality 1 below:

$$Tm \geq T_H \geq 1.3 * Tm,$$

where Tm denotes a melting point of the metal powder, and a unit thereof is absolute temperature (K).

13. The method of claim 11, wherein the intermetallic compound layer comprises an aluminide or a silicide.

14. The method of claim 11, wherein the second heat treatment is performed at a temperature ranging from 900° C. to 1,200° C. for a time ranging from 10 hours to 36 hours.

15. The method of claim 11, wherein the first heat treatment and the second heat treatment are consecutively performed.

16. The method of claim 11, wherein the heat treatment further comprises generating voids in a region where the substrate and the uneven structure are in contact with each other.

17. The method of claim 11, wherein the heat treatment comprises removing the viscid material.

18. The method of claim 11, wherein the viscid material comprises at least one material selected from the group consisting of polyvinyl alcohol (PVA), polyethylene (PE), polypropylene (PP), polystyrene (PS), polyethylene glycol (PEG), polymethyl methacrylate (PMMA), polyoxymethylene (POM), polyacrylic acid (PAA), and styrene-butadiene rubber, carboxymethyl cellulose, or a combination thereof.

19. The method of claim 11, wherein the metal powder comprises aluminum (Al) powder or Al-silicon (Si) alloy powder.

20. The method of claim 11, wherein the heat treatment is performed in an atmosphere comprising an inert gas or a reducing gas.

* * * * *